(12) United States Patent
Matsumoto et al.

(10) Patent No.: US 8,210,491 B2
(45) Date of Patent: Jul. 3, 2012

(54) SYSTEM FOR DAMPENING THE VIBRATION EXPERIENCED BY A LINE

(75) Inventors: Jack T. Matsumoto, Sunnyvale, CA (US); Barry H. Koepke, Castle Rock, CO (US)

(73) Assignee: GE-Hitachi Neuclear Energy Americas, LLC, Wilmington, NC (US)

( * ) Notice: Subject to any disclaimer, the term of this patent is extended or adjusted under 35 U.S.C. 154(b) by 1050 days.

(21) Appl. No.: 12/129,915

(22) Filed: May 30, 2008

(65) Prior Publication Data

US 2009/0294229 A1   Dec. 3, 2009

(51) Int. Cl.
*F16M 13/00* (2006.01)

(52) U.S. Cl. .................... 248/559; 248/638; 403/188

(58) Field of Classification Search ............. 248/229.15, 248/229.25, 230.6, 231.71, 562, 643, 650, 248/656, 636, 637; 24/525, 569; 403/188; 297/216.1; 52/167

See application file for complete search history.

(56) References Cited

U.S. PATENT DOCUMENTS

| 5,752,807 A | 5/1998 | Erbes |
| 6,435,839 B1 | 8/2002 | Erbes |

*Primary Examiner* — Amy Sterling
*Assistant Examiner* — Erin W Smith
(74) *Attorney, Agent, or Firm* — Ryan Alley Intellectual Property Law

(57) ABSTRACT

A system for dampening the vibrations experienced by a sensing line connected to a jet pump within a nuclear reactor pressure vessel. The system may include an eccentric clamp assembly (ECA). The ECA includes: a cam member and saddle; a key member, such as a t-bolt; an eccentric member; a clamp member; clamp body. A jacking bolt, washers, and an ECA connector lock the assembly in place. The ECA allows for adjustment in multiple directions, reducing installation time.

20 Claims, 5 Drawing Sheets

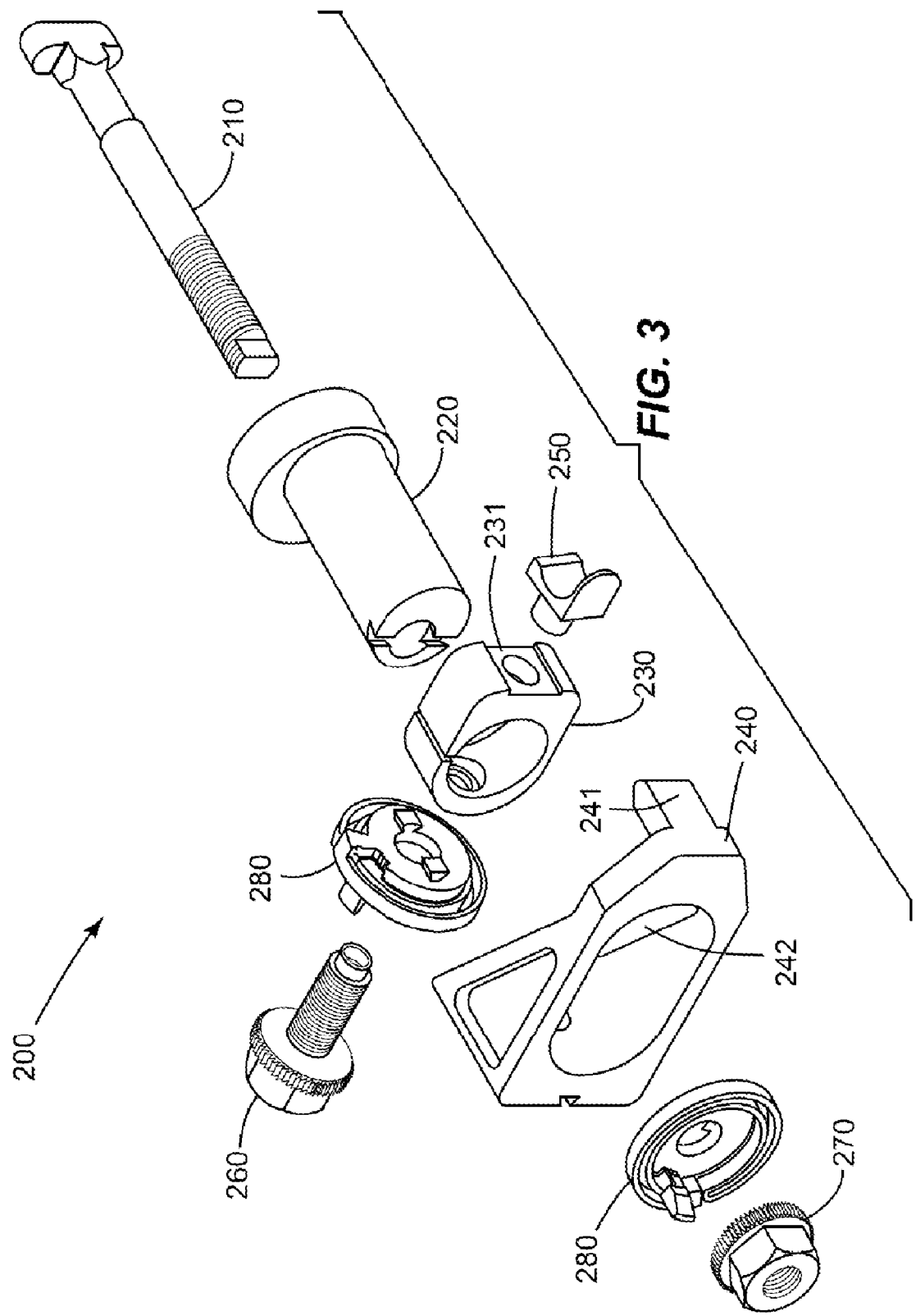

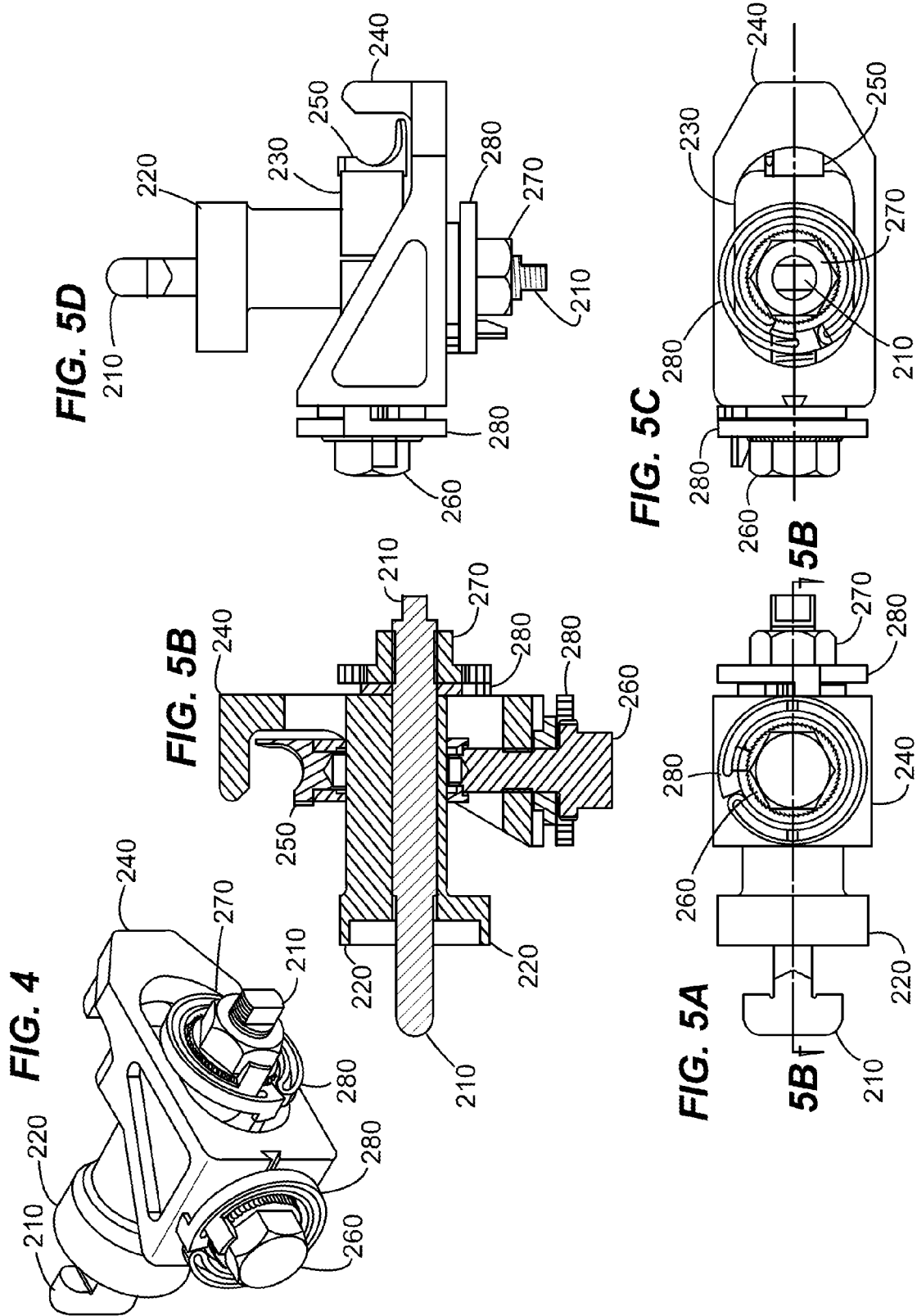

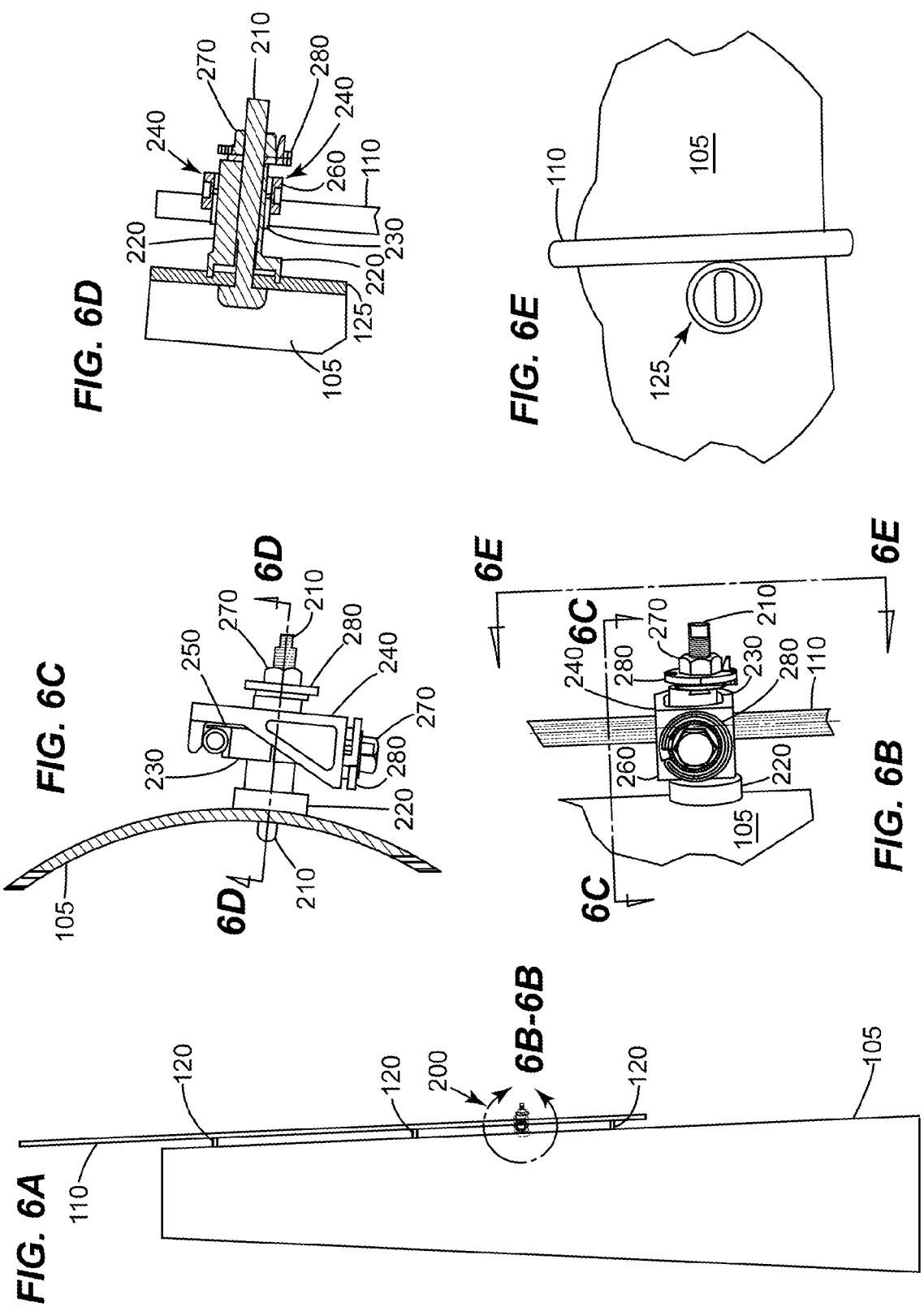

SYSTEM FOR DAMPENING THE VIBRATION EXPERIENCED BY A LINE

BACKGROUND OF THE INVENTION

The present application relates generally to nuclear reactors; and more particularly to, a system for dampening the level of vibration experienced by sensing lines within a nuclear reactor pressure vessel.

One type of nuclear reactor, a conventional boiling water reactor (BWR) is shown in FIG. 1. During operation of the reactor, coolant water circulating inside a reactor pressure vessel (RPV) 10 is heated by nuclear fission produced in the nuclear fuel core 35. Feedwater is admitted into the RPV 10 via a feedwater inlet 15 and a feedwater sparger 20. The feedwater flows downwardly through a downcomer annulus 25, which is an annular region between RPV 10 and a core shroud 30.

The core shroud 30 is a stainless steel cylinder that surrounds the nuclear fuel core 35, which includes a plurality of fuel bundle assemblies 40 (only a few are illustrated in FIG. 1). A top guide 45 and a core plate 50 supports each of the fuel bundle assemblies 40.

The coolant water flows downward through the downcomer annulus 25 and into the core lower plenum 55. Then the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through standpipes 70 on top of the shroud head 65 and enters the steam separators 75, which separate water from steam. The separated water is recirculated back to the downcomer annulus 25 and the steam flows out of the RPV 10 and to a steam turbine, or the like, (not illustrated).

The BWR also includes a coolant recirculation system, which provides the forced convection flow through the nuclear fuel core 35 necessary to attain the required power density. A portion of the water is sucked from the lower end of the downcomer annulus 25 via recirculation water outlet 80 and forced by a recirculation pump (not illustrated) into a plurality of jet pump assemblies 85 (one is illustrated in FIG. 1) via recirculation water inlets 90. The jet pump assemblies 85 are typically circumferentially distributed around the core shroud 30 and provide the required reactor core flow. A typical BWR has sixteen to twenty-four inlet mixers 95.

As illustrated in FIG. 1, a conventional jet pump assembly 85 comprises a pair of inlet mixers 95. Each inlet mixer 95 has an elbow welded thereto, which receives pressurized driving water from a recirculation pump (not illustrated) via an inlet riser 100. A type of inlet mixer 95 comprises a set of five nozzles circumferentially distributed at equal angles about the inlet mixer axis (not illustrated in the Figures). Here, each nozzle is tapered radially inwardly at the nozzle outlet. This convergent nozzle energizes the jet pump assembly 85. A secondary inlet opening (not illustrated) is radially outside of the nozzle exits. Therefore, as jets of water exit the nozzles, water from the downcomer annulus 25 is drawn into the inlet mixer 95 via the secondary inlet opening, where mixing with water from the recirculation pump then occurs. The water then flows into the diffuser 105.

Each jet pump assembly 85 has a sensing line 110 (illustrated in FIG. 2) that is in fluid communication with a plurality of pressure taps at the top of the diffuser 105 and with instrumentation (not shown) located outside of the RPV 10. These sensing fines 110 allow the core flow to be measured and monitored. The flow through and outside the jet pump assemblies 85 contains pressure fluctuations from various sources in the reactor system. These pressure fluctuations can have frequencies close to one or more natural vibration modes of the sensing line piping 110. The vibration modes experienced by the sensing fine 110 depends on the spacing and stiffness of support blocks 115, which attach the sensing line piping 110 to the diffuser 105. In addition to pressure fluctuations, there may be other sources of vibration that can have frequencies close to one or more natural vibration modes of the sensing line piping 110. When an excitation frequency happens is near the natural frequencies of the sensing line piping 110, at a particular location, vibration of the piping 110 exerts loads on support attachments. This has caused cyclic fatigue cracking, and failure of both the piping 110 and the welded attachments to the support blocks 115. This can result in loss of the indication of core flow, which may require plant shutdown.

Currently, operators of the RPV 10 may use a system of dampening the vibration modes experienced by the sensing lines 110. The current system may incorporate one or more additional support blocks 115, or the like, to dampen the vibration or change the frequency of the line 110.

There are a few possible problems with the currently known systems for dampening the vibration. Currently known system are custom made and require precise measurements of the existing configuration of the diffuser 105 and sensing line 110. These systems also may deflect the sensing line 110 during installation. These systems generally require longer installation time and expose operators to longer period of radioactivity.

For the aforementioned reasons, there is a need for a new system for dampening the vibration experienced by the sensing line 110. The system should not require precise measurements of the existing configuration, such as the diffuser 105. The system should be adaptable to a variety of configurations and allow for adjustments after installation. The system should not deflect the sensing line 110. The system should not require customer made components. The system should reduce the installation time and lower operator exposure to radioactivity.

BRIEF DESCRIPTION OF THE INVENTION

In accordance with an embodiment of the present invention, a system for dampening the vibration experienced by a line integrated with a structure, the system comprises an eccentric clamp assembly (ECA), wherein the ECA engages a mount on the structure, the ECA comprises: a key member comprising: a shank portion comprising a threaded portion located on a fore end, and a head portion located on an aft end; an eccentric member comprising: a base comprising a center, wherein the base engages the mount; a shaft, wherein an aft end of the shaft is eccentrically attached to the base; an opening passing through the eccentric member, wherein the opening allows for the key member to pass through the eccentric member; a cam member comprising: a cavity, wherein an inner portion of the cavity is larger than an outer diameter of the cylindrical shaft, allowing for the cam member to slidably communicate along the cylindrical shaft; a receiving portion, wherein the receiving portion engages the line; a cam opening, wherein the cam opening is located approximately perpendicular to the cavity; a clamp member comprising: a recess comprising at least one shoulder, wherein the recess receives the cam member and the at least one shoulder prevents the cam member from passing through the clamp member, and wherein the clamp member allows a portion of the eccentric member to pass through; a clamp arm that secures a portion of the line received by the cam member; and a clamp member opening, wherein the clamp member opening is located approximately perpendicular to the recess; wherein the ECA adjusts to engage the mount and receives the line; allowing for the structure, line, and ECA to form an integrated unit which reduces the level of vibration experienced by the line.

In accordance with another embodiment of the present invention, a system for reducing the vibration experienced by a sensing line within a nuclear reactor pressure vessel, the system comprising: a jet pump assembly; an inlet riser; a diffuser; a sensing line positioned adjacent the diffuser by at least one support block; and an eccentric clamp assembly (ECA), wherein the ECA engages a mount on the diffuser, the ECA comprises: a key comprising: a shaft, wherein the shaft comprises: a threaded portion located on a fore end, and a head portion located on an aft end; an eccentric comprising: a base comprising a center, wherein the base engages the mount; a cylindrical shaft, wherein an aft end of the cylindrical shaft is eccentrically attached to the base; an opening passing through the eccentric, wherein the opening allows for the key to pass through the eccentric; a cam comprising: a cavity, wherein an inner diameter of the cavity is larger than an outer diameter of the cylindrical shaft, allowing for the cam to move along the cylindrical shaft; a receiving portion, wherein the receiving portion receives the sensing line; a cam opening, wherein the cam opening is located adjacent to the cavity; a clamp comprising: a recess comprising at least one shoulder, wherein the recess receives the cam and the at least one shoulder prevents the cam from passing through the clamp, and wherein the clamp allows a portion of the eccentric to pass through; a clamp arm that secures a portion of the sensing line received by the cam; and a clamp opening, wherein the clamp opening is located adjacent the recess; wherein the ECA is adjustable in multiple directions to engage the mount and receives the sensing line; allowing for the diffuser, sensing line, and ECA to unite, which reduces the vibration experienced by the sensing line.

BRIEF DESCRIPTION OF THE DRAWING

FIG. 3 is a schematic illustrating an exploded isometric view of an eccentric clamp assembly in accordance with an embodiment of the present invention.

FIG. 4 is a schematic illustrating an isometric view of an assembled eccentric clamp assembly in accordance with an embodiment of the present invention.

FIGS. 5A-5D are schematics, illustrating plan, elevation, and cross-sectional views of an eccentric clamp assembly, in accordance with an alternate embodiment of the present invention.

FIGS. 6A-6E are schematics, illustrating elevation, detail, and cross-sectional views of an eccentric clamp assembly installed on a jet pump assembly, in accordance with an alternate embodiment of the present invention.

DETAILED DESCRIPTION OF THE INVENTION

Certain terminology is used herein for convenience only and is not to be taken as a limitation on the invention. For example, words such as "upper," "lower," "left," "front", "right," "horizontal," "vertical," "upstream," "downstream," "fore", and "aft" merely describe the configuration shown in the Figures. Indeed, the components may be oriented in any direction and the terminology, therefore, should be understood as encompassing such variations unless specified otherwise.

An embodiment of the present invention takes the form of a system that may reduce the level of vibrations experience by a sensing line connected to a jet pump assembly 85. An embodiment of the present invention provides at least one eccentric clamp assembly (ECA) that generally adds additional supports, which connects the sensing line with the jet pump assembly 85. After installation, the ECA(s) may lower the amplitude of, and/or change the frequency of the vibration experienced by the sensing line.

The present invention has the technical effect of reducing the level of vibration experienced by a line, such as, but not limiting of, a pipe, a cable, tubing, or the like, that is connected to at least one separate structure. The structure is an apparatus that generates and/or experiences vibration. For example, but not limiting of, the apparatus includes: a jet pump assembly 85, steam generator, a pipe, a pressure vessel, a heat exchanger, a pump, a condenser, a tank, or the like. The present invention provides additional support to the line at a new location or may replace an existing support block, such as, but not limiting of, a standoff; which may alter the natural frequencies to avoid resonance from occurring when the structure is excited.

Figure 1:
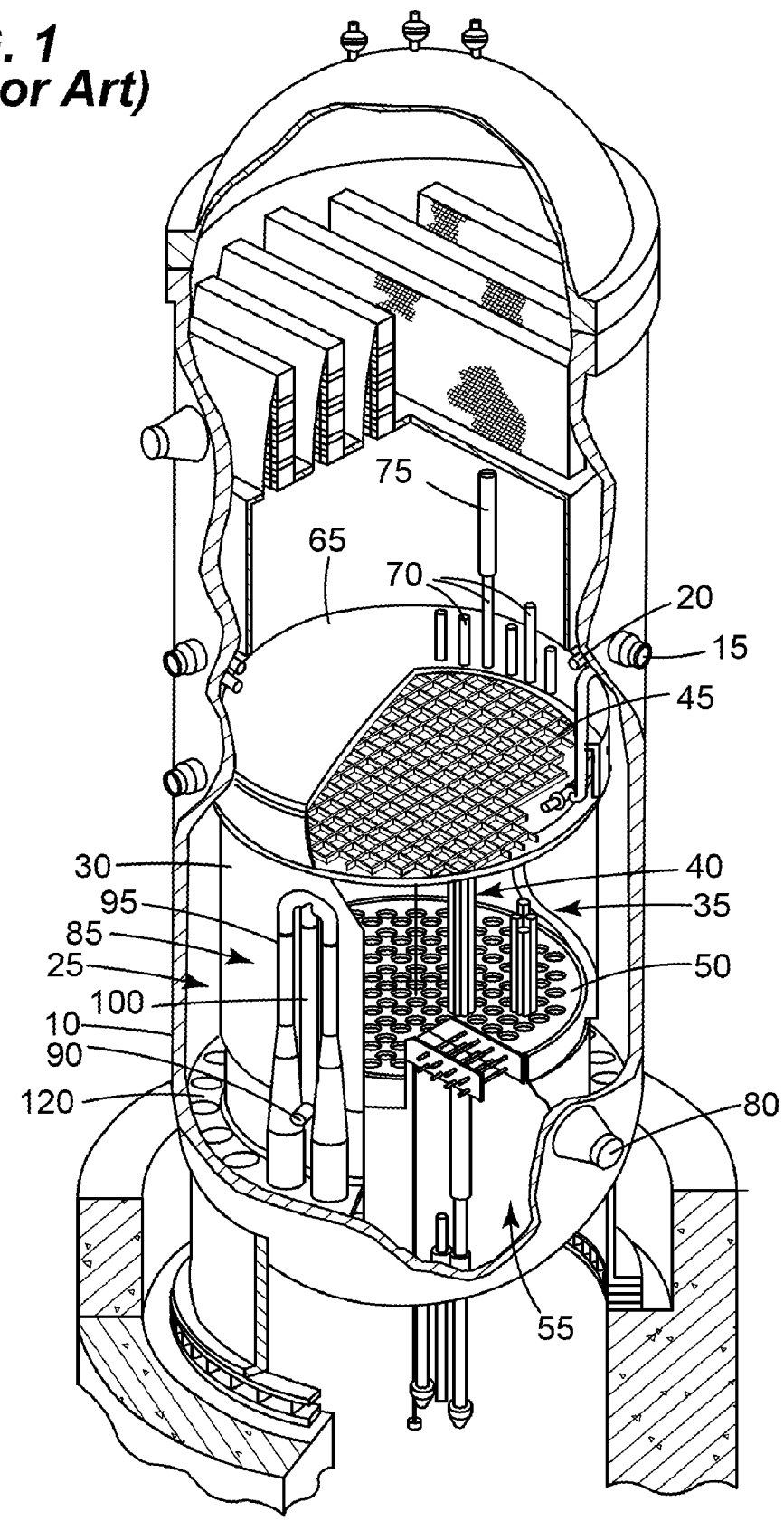
FIG. 1 is a schematic illustrating the environment in which an embodiment of the present invention operates.
Figure 2:
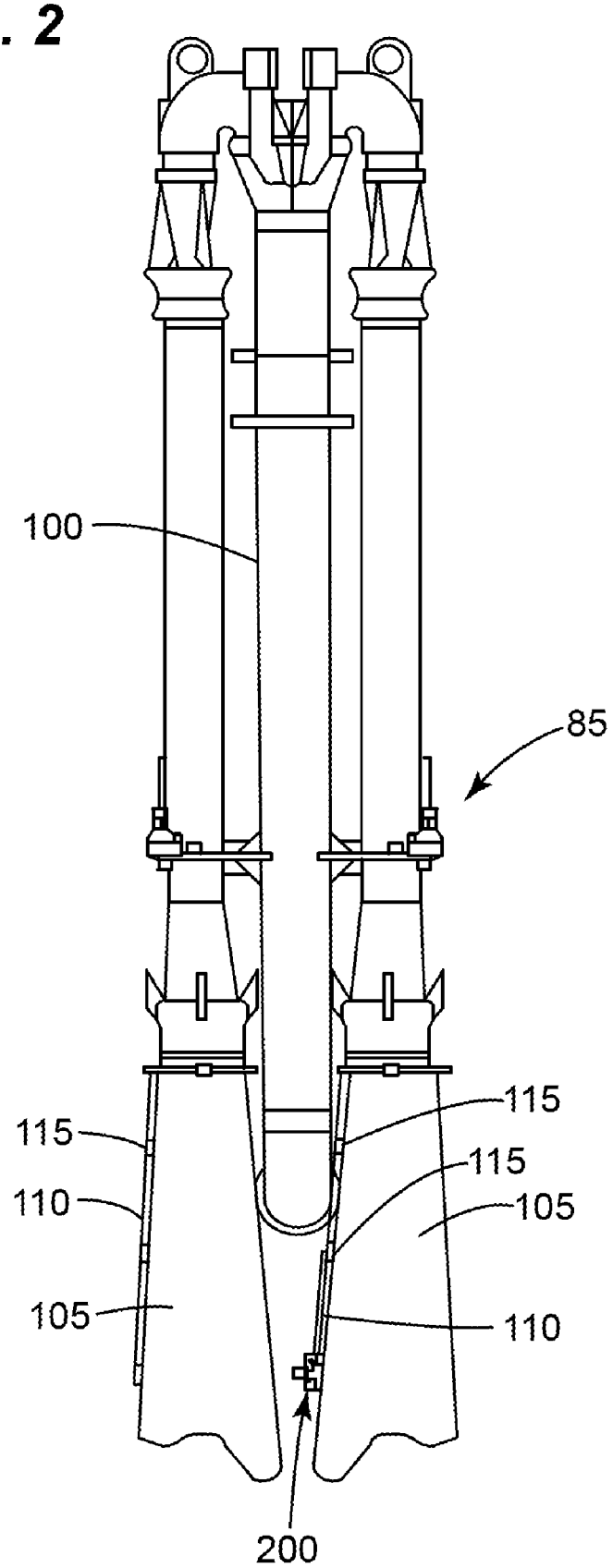
FIG. 2 is a schematic illustrating an elevation view, with parts removed, of the jet pump assembly, illustrated in FIG. 1, in accordance with an embodiment of the present invention.

Referring again to the Figures, where the various numbers represent like pails throughout the several views. FIG. 2 is a schematic illustrating an elevation view of the jet pump assembly 85 of FIG. 1 and also illustrates an eccentric clamp assembly 200 installed on a sensing line 110, in accordance with an embodiment of the present invention.

At least one sensing line 110 may be mounted to the jet pump assembly 85 by a plurality of support blocks 115. An eccentric clamp assembly (ECA) 200 clamps the sensing line 110 to diffuser 105. The ECA 200 connects the jet pump assembly 85, sensing line 110, and support blocks 115. This may reduce the effect of the vibration received by sensing line 110 from the jet pump assembly 85. In an embodiment of the present invention, the diffuser 105 may only require a single ECA 200 to reduce the vibration levels. In an alternate embodiment of the present invention, the diffuser 105 may require multiple ECAs 200 to reduce the vibration level.

FIG. 3 is a schematic illustrating an exploded isometric view of an eccentric clamp assembly 200 in accordance with an embodiment of the present invention. An embodiment of the ECA 200 may include: a key member 210; an eccentric member 220; a cam member 230; a clamp member 240; a saddle 250; a jacking bolt 260; an ECA connector 270; and at least one washer 280.

The key member 210 allows for the ECA 200 to be assembled and secured. In an embodiment of the present invention, the key member 210 may include: a shank portion having a threaded portion located at a fore end, and a head portion located at an aft end. The key member 210 provides a surface, which allows for ECA 200 components to directly or indirectly assemble thereon. After the components are connected, engaged, assembled, or the like, the key member 210 also provides a way lock the components in place. One portion of the head end is connectable to the mount 125 (illustrated, for example, in FIG. 6D). This portion may have a shape allowing for insertion and rotation within the mount 125 illustrated in FIG. 6D. In an alternate embodiment of the present invention this portion may include a series of notches or threads that engage a mating series of notches or threads on the mount 125. The key member 210 may have an overall shape resembling a T-bolt, toggle-bolt, bolt, or other component used for connecting at least one item to a structure.

The eccentric member 220 provides the ECA 200 capability to adjust in axial and tangential directions when connected to the diffuser 105. This benefits a user by not requiring critical measurements of the mount 125. The eccentric member 220 may have a base, which engages the mount 125; a cylindrical shaft, wherein an aft portion of the cylindrical shaft is eccentrically attached to the base, an opening passing through the length of the eccentric member 220, wherein the opening, such as a cylindrical hole or the like, allows for the key member 210 to pass through the length of eccentric member 220.

The cam member 230 may make the ECA 200 adaptable to varying configuration of the diffuser 105 and sensing line 110. Instead of a user having to move the location of the sensing line 110, a user may slide the cam member 230 along the shaft of the eccentric member 220 in order to engage the sensing line 110. The cam member 230 may include a cavity area, wherein an inner diameter of the cavity is larger than an outer diameter of the shaft of the eccentric member 220, allowing for the cam member 230 to slidably communicate along the cylindrical shaft. The cam member 230 also includes: a receiving portion 231, wherein the receiving portion 231 receives the sensing line 110; a cam opening, which may be threaded and located approximately perpendicular to the cavity. As illustrated, the cam member 230 may include a saddle 250, which may include a portion shaped to mate with the sensing line 110. The saddle 250 may rotate to accommodate an axis or region of the sensing line 110. The saddle 250 restricts the movement of the sensing line 110, while adding greater flexibility to the ECA 200. The saddle 250 may be located on the cam member 230 in a region perpendicular to the cavity.

A jacking bolt 260 and a washer 280 may engage the cam member 230 via the cam member opening. The jacking bolt 260 generally serves to secure the position of the cam member 230 and saddle 250 on the eccentric member 220. The jacking bolt 260 may include a head portion, an integrated washer portion, and a threaded shaft portion. The outside diameter of the integrated washer may include a series of grooves, notches, indentations, or the like. The washer 280 may have a disk-like shape and include a ratchet portion. The ratchet portion of the washer 280 engages the series of grooves (or the like) of the jacking bolt 260. This engagement aids in preventing the jacking bolt 260 from loosening after the jacking bolt 260 is tightened.

The clamp member 240 may clamp the sensing line 110 to the cam member 230. The clamp member 240 generally allows for the jacking bolt 260, washer 280, cam member 230, and saddle 250 to assemble, in accordance with an embodiment of the present invention. The clamp member 240 may be formed of any shape allowing for the ECA 200 to be assembled and connected to the sensing line 110 and the diffuser 105.

As illustrated, the clamp member 240 may include a recess that can receive the cam member 230. The recess includes at least one shoulder 242, which prevents the cam member 230 from passing through the clamp member 240. The clamp member 240 allows a portion of the eccentric member 220 to pass through. The clamp member 240 may also include a clamp arm 241 that secures a portion of the sensing line 110. The clamp member 240 may also include a clamp member opening located approximately perpendicular to the recess. This opening may be threaded to mates with the threaded portion of the jacking bolt 260; thereby allowing the jacking bolt 260 to pass through the washer 280 and cam member 230, in order to engage the eccentric member 220. In an alternate embodiment of the present invention, the side adjacent the cam member opening may include a slot or dovetail, for aiding in location the washer 280 on the clamp member 240.

An ECA connector 270 and a washer 280 (previously described) may be integrated with the threaded portion on the key member 210. Collectively, these components transfer a compressive load that secures the ECA 200 position. As illustrated in FIG. 3, the ECA connector 270 may form a threaded nut integrated with a lock washer portion. The lock washer portion generally comprises a disk-like shape and may include an opening that allows a portion of the key member 210 to pass through. The lock washer may also include a series of grooves, notches, or the like, around a periphery of an outside diameter, which mate with the ratchet portion of the washer 280, as described. The outside diameter is large enough to prevent the ECA connector 270 from moving through the clamp member 240. When assembled, the ECA connector 270 applies a compressive load to the ECA 200 that secures the position of the eccentric member 220 on the key member 210.

FIG. 4 is a schematic illustrating an isometric view of an eccentric clamp assembly 200 in accordance with an embodiment of the present invention. Here, the ECA 200 of FIG. 3 is assembled. The engagement of the ECA connector 270, and jacking bolt 260 with the respective washer 280 is illustrated. The series of grooves on the jacking bolt 260 and on the ECA connector 270 mates with the ratchet portions on each washer 280. As discussed, this mating may prevent the jacking bolt 260 and the connector 270 from loosening after installation of the ECA 200.

FIGS. 5A-5D, collectively FIG. 5, are schematics, illustrating plan, elevation, and cross-sectional views of an eccentric clamp assembly 200, in accordance with an alternate embodiment of the present invention. FIG. 5A illustrates a side plan view of the assembled ECA 200 of FIG. 4. Here, the key member 210 includes a t-shape located on an aft-end. The t-shape may engage the mount 125, as described. The size of the t-shape may be standardized based upon the size and shape of the mount 125. FIG. 5B illustrates a cross-sectional view taking along lines A-A in FIG. 5A. FIG. 5B particularly illustrates how a portion of the clamp member 240 tends to overlap the saddle 250, which secures the sensing line 110 (not illustrated in FIG. 5) within the ECA 200. FIGS. 5C and 5D illustrate additional plan and elevation views, respectively, of the ECA 200 and may aid the user with understanding the ECA 200.

FIGS. 6A-6D are schematics, illustrating elevation, detail, and cross-sectional views of an eccentric clamp assembly 200 installed on a jet pump assembly 85, in accordance with an alternate embodiment of the present invention. FIG. 6A specifically illustrates an elevation view of the ECA 200 installed in a typical operational environment. Here, the ECA 200 provides an additional support to the sensing fine 110 that is connected to the diffuser 105. A user may locate the ECA(s) 200 between the standoff brackets 120. FIG. 6B illustrates a close-up view of the Detail A in FIG. 6A.

FIG. 6C illustrates a sectional view, partially in cross-section, along line B-B of FIG. 6B. Here, the eccentric member 220 fits reasonably flush with the diffuser 105. This minimizes leakage between the inner and outer portions of the diffuser 105. Also illustrated in FIG. 6C, is the engagement of the cam member 230, clamp member 240, saddle 250, and the sensing line 110. As discussed, a portion of the clamp member 240, such as an arm or the like, transfers a portion of the clamping forces provided by the ECA connector 270 to the sensing fine 110.

FIG. 6D illustrates a cross-sectional view along line D-D of FIG. 6C. Here, the engagement of key member 210, and eccentric member 220 with the mount 125 is illustrated. A portion of the key member 210, such as the t-bolt, engages the mount 125. Here, a user may insert and rotate the key member 210 into the mount 125. The eccentric member 220 may then surround the mount 125, forming a seal, or the like, between the mount 125 and the eccentric member 220, when the ECA 200 is tightened onto the diffuser 105.

FIG. 6E, illustrates a sectional view along lines C-C of FIG. 6B. FIG. 6B illustrates the mount 125 on the diffuser 105. In an embodiment of the present invention, the mount 125 may be a slot and spotface groove (hereinafter "slot-face"). The slot-face may be machined into the outside diameter of the diffuser 105. The slot portion allows for inserting and manipulating the key member 210. The spotface groove allows for creating a flat sealing surface, to minimize leakage, from the inner diameter to the outer diameter of the diffuser 105. The slot-face may serve as the centerline/axis of the eccentric member 220.

The components of present invention may be formed of any material capable of withstanding the operating environment to which the ECA 200 will be exposed.

In use, the eccentric member 220 allows for the circumferential positioning of the slot-face of the mount 125 to the sensing line 110 not to be a critical measurement. For example, but not limiting of, this circumferential position may be within +/−0.250 inches. As the eccentric member 220 is rotated, the cam member 230 may rotate into align with the axis of the sensing line 110. Next, the saddle 250 may be adjusted to receive the sensing line 110. Next, the cam member 230 may be manipulated along the cylindrical shaft portion of the eccentric member 220 to accommodate variations in the sensing line 110 distances from the diffuser 105. After the eccentric member 220 is rotated and the cam member 230 is positioned, the key member 210 may be secured by tightening the ECA connector 270 into the washer 280. Lastly, the jacking bolt 260 may be tightened into the washer 280, securing the clamp member 240 to the sensing line 110.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for dampening the vibration experienced by a line integrated with a structure, the system comprises an eccentric clamp assembly (ECA), wherein the ECA engages a mount on the structure, the ECA comprises:
   a key member comprising: a shank portion comprising a threaded portion located on a fore end, and a head portion located on an aft end;
   an eccentric member comprising: a base comprising a center, wherein the base engages the mount; a shaft, wherein an aft end of the shaft is eccentrically attached to the base; an opening passing through the eccentric member, wherein the opening allows for the key member to pass through the eccentric member;
   a cam member comprising: a cavity, wherein an inner portion of the cavity is larger than an outer diameter of the cylindrical shaft, allowing for the cam member to slidably communicate along the cylindrical shaft; a receiving portion, wherein the receiving portion engages the line; a cam opening, wherein the cam opening is located approximately perpendicular to the cavity;
   a clamp member comprising: a recess comprising at least one shoulder, wherein the recess receives the cam member and the at least one shoulder prevents the cam member from passing through the clamp member, and wherein the clamp member allows a portion of the eccentric member to pass through; a clamp arm that secures a portion of the line received by the cam member; and
   a clamp member opening, wherein the clamp member opening is located approximately perpendicular to the recess;
   wherein the ECA adjusts to engage the mount and receives the line; allowing for the structure, line, and ECA to form an integrated unit which reduces the level of vibration experienced by the line.

2. The system of claim 1, further comprising an ECA connector, wherein the ECA connector comprises a nut that mates with the threaded portion of the key member, and wherein the ECA connector applies a compressive load to press together the eccentric, cam, and clamp members.

3. The system of claim 2, further comprising at least one washer, wherein the washer comprises a ratchet portion that prevents the ECA connector from loosening after being tightened, and wherein an outer diameter of the washer bars the ECA connector from passing through the clamp member.

4. The system of claim 3, further comprising a lock washer integrated with the nut, wherein the lock washer comprises an opening that allows the key member to pass through, and a series of grooves around a periphery of an outside diameter of the lock washer, wherein grooves mate with the ratchet portion of the at least one washer.

5. The system of claim 1, wherein the cam member comprises a saddle, which receives the line, and wherein the saddle restricts the translational movement of the line.

6. The system of claim 5, wherein the clamp member opening comprises threads and receives a jacking bolt, wherein the jacking bolt comprises a head portion, a threaded shaft portion, and an integrated washer portion positioned between the head portion and the threaded shaft portion.

7. The system of claim 6, wherein the integrated washer portion comprises a series of grooves around a periphery of an outside diameter.

8. The system of claim 7, further comprising at least one washer, wherein the at least one washer comprises a ratchet portion that prevents the jacking bolt from loosening after being tightened.

9. The system of claim 8, wherein the integrated washer portion engages the ratchet portion, and wherein the clamp member, cam member, saddle, washer portion and line are pressed together by a compressive load applied by the jacking bolt.

10. The system of claim 1, wherein an outer diameter of the cylindrical shaft is less than an inside diameter of the base.

11. The method of claim 1, wherein a fore end of the cylindrical shaft comprises a slot, wherein the slot anchors the washer to the eccentric member.

12. A system for reducing the vibration experienced by a sensing line within a nuclear reactor pressure vessel, the system comprising:
- a jet pump assembly including an inlet riser, a diffuser, and a sensing line positioned adjacent the diffuser by at least one support block; and
- an eccentric clamp assembly (ECA), wherein the ECA engages a mount on the diffuser, the ECA comprises:
- a key comprising: a shaft, wherein the shaft comprises: a threaded portion located on a fore end, and a head portion located on an aft end;
- an eccentric comprising: a base comprising a center, wherein the base engages the mount; a cylindrical shaft, wherein an aft end of the cylindrical shaft is eccentrically attached to the base; an opening passing through the eccentric, wherein the opening allows for the key to pass through the eccentric;
- a cam comprising: a cavity, wherein an inner diameter of the cavity is larger than an outer diameter of the cylindrical shaft, allowing for the cam to move along the cylindrical shaft; a receiving portion, wherein the receiving portion receives the sensing line; a cam opening, wherein the cam opening is located adjacent to the cavity;
- a clamp comprising: a recess comprising at least one shoulder, wherein the recess receives the cam and the at least one shoulder prevents the cam from passing through the clamp, and wherein the clamp allows a portion of the eccentric to pass through; a clamp arm that secures a portion of the sensing line received by the cam; and
- a clamp opening, wherein the clamp opening is located adjacent the recess;
- wherein the ECA is adjustable in multiple directions to engage the mount and receives the sensing line; allowing for the diffuser, sensing line, and ECA to unite, which reduces the vibration experienced by the sensing line.

13. The system of claim 12, further comprising an ECA connector, wherein the ECA connector comprises a nut that mates with the threaded portion of the key, and wherein the eccentric, cam, and clamp are pressed together by a compressive load applied by the ECA connector when tightened on the key.

14. The system of claim 13, further comprising at least one washer, wherein the washer comprises a ratchet portion that bars the ECA connector from loosening after being tightened, and wherein an outer diameter of the washer bars the ECA connector from passing through the clamp.

15. The system of claim 14, further comprising a lock washer integrated with the nut, wherein the lock washer comprises an opening that allows the key to pass through, and a series of grooves around a periphery of an outside diameter of the lock washer, wherein grooves mate with the ratchet portion of the at least one washer.

16. The system of claim 12, wherein the cam comprises a saddle that receives the sensing line, and wherein the saddle restricts the movement of the sensing line.

17. The system of claim 16, wherein the clamp opening comprises threads and receives a bolt, wherein the bolt comprises a head, a threaded shaft, and an integrated washer positioned between the head and the threaded shaft.

18. The system of claim 17, wherein the integrated washer comprises a series of grooves around a periphery of an outside diameter.

19. The system of claim 18, further comprising at least one washer, wherein the at least one washer comprises a ratchet that prevents the bolt from loosening after being tightened.

20. The system of claim 19, wherein the integrated washer engages the ratchet, and wherein the clamp, cam, saddle, washer and sensing line are pressed together by a compressive load applied by the bolt.

* * * * *

UNITED STATES PATENT AND TRADEMARK OFFICE
CERTIFICATE OF CORRECTION

| | |
|---|---|
| PATENT NO. | : 8,210,491 B2 |
| APPLICATION NO. | : 12/129915 |
| DATED | : July 3, 2012 |
| INVENTOR(S) | : Matsumoto et al. |

It is certified that error appears in the above-identified patent and that said Letters Patent is hereby corrected as shown below:

On the Title Page, Item 73, Assignee, "Neuclear" should read --Nuclear--.

Signed and Sealed this
Twenty-first Day of May, 2013

Teresa Stanek Rea
*Acting Director of the United States Patent and Trademark Office*